Figure 1:
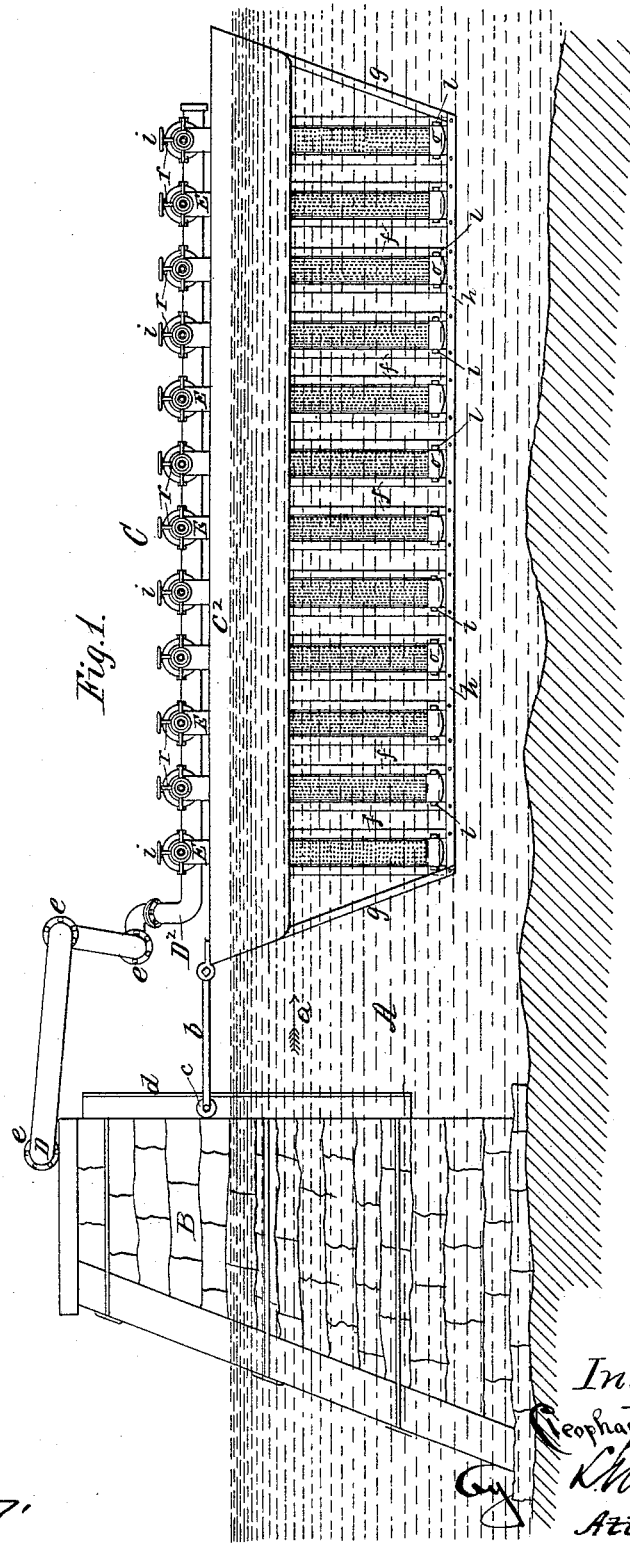

(No Model.) 4 Sheets—Sheet 1.
C. MONJEAU.
APPARATUS FOR WATER SUPPLY.

No. 444,007. Patented Jan. 6, 1891.

Witnesses:
W. C. Jirdinston.

Inventor:
Ceophas Monjeau
Attorney.

(No Model.) 4 Sheets—Sheet 2.

C. MONJEAU.
APPARATUS FOR WATER SUPPLY.

No. 444,007. Patented Jan. 6, 1891.

Witnesses:
W. C. Jirdinston.

Inventor:
Cleophas Monjeau
by R. M. Hosea
Attorney.

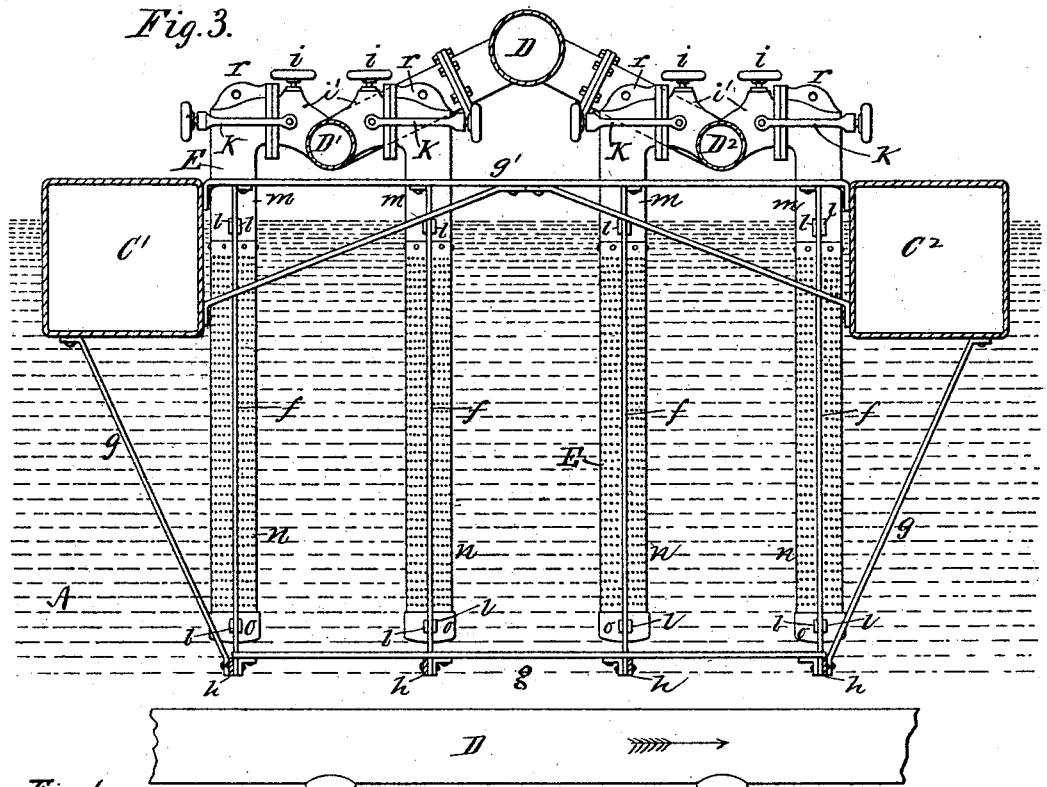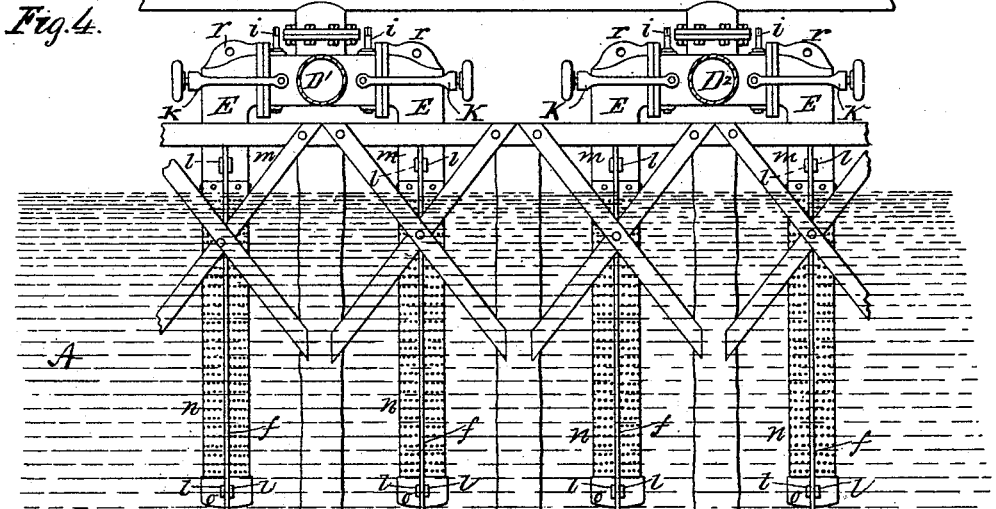

(No Model.) 4 Sheets—Sheet 4.
C. MONJEAU.
APPARATUS FOR WATER SUPPLY.
No. 444,007. Patented Jan. 6, 1891.
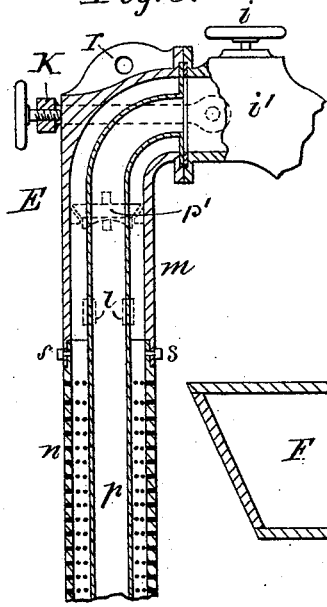
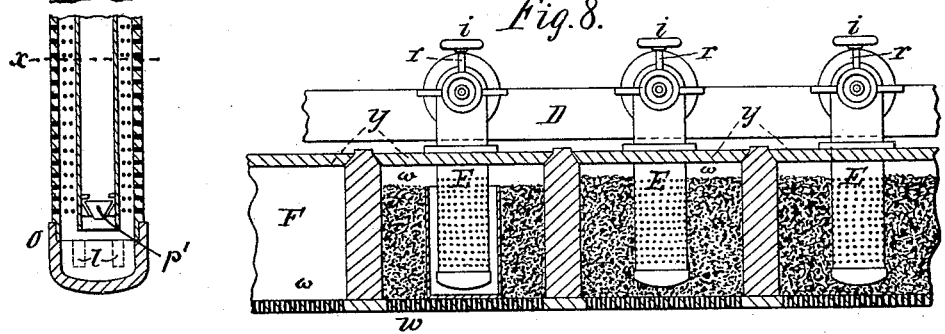
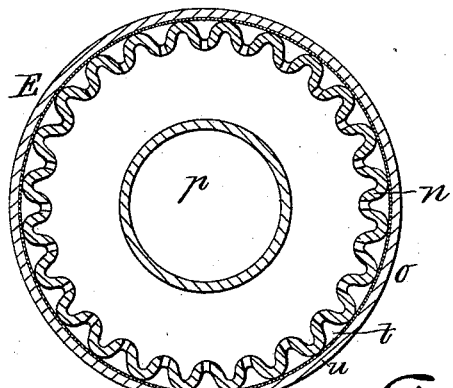
Witnesses:
W. C. Jirdinston.
Inventor
Cleophas Monjeau
by R. M. Hosea
Attorney.

UNITED STATES PATENT OFFICE.

CLEOPHAS MONJEAU, OF MIDDLETOWN, OHIO.

APPARATUS FOR WATER-SUPPLY.

SPECIFICATION forming part of Letters Patent No. 444,007, dated January 6, 1891.

Application filed February 19, 1889. Serial No. 300,489. (No model.)

*To all whom it may concern:*

Be it known that I, CLEOPHAS MONJEAU, a citizen of the United States, residing at Middletown, Ohio, have invented new and useful Improvements in Methods and Apparatus for Water-Supply, of which the following is a specification.

My invention relates to an apparatus for obtaining a supply of pure water for domestic and other purposes for the use of cities, villages, manufacturing establishments, public institutions, &c. Heretofore in such cases, as a matter of engineering practice, so far as I am aware, wherever resort is had to streams as a source of supply no systematic filtration has been employed except where some natural filter—such as a gravel-bar—existed, which offered special facilities; but in general settling-reservoirs are practically the sole means employed for purification of the general supply, and are obviously an unsatisfactory solution of the problem.

Without further reference to the present state of the art as commonly understood and practiced, or pointing out in detail the disadvantages of the methods in use, which are well known, I may say that my invention, which is designed to obviate many or all the disadvantages of the methods in use, and may be employed as an adjunct to the system of settling-reservoirs, provides for the purification of water at the source of pumping supply—that is to say, at the reservoir, pond, lake, or stream whence the pumping-mains take their supply of water.

My invention may be said to consist, generally, in an apparatus for obtaining a pure water-supply for cities, towns, manufacturing establishments, public institutions, &c., from a reservoir, stream, lake, or other surface body of water, by the interposition between the pumping-mains and the source of supply of a system of filtering mouths or inlets arranged as an aggregation of integral elements, detachable for cleansing, repairing, renewing, &c.

I prefer to mount the system of filtering-inlets (in one or more groups) upon a floating caisson or caissons, so as to rise and fall with the varying surface-level and draw the water-supply from a uniform depth; but in many cases flotation would not be required.

These being the general features of my invention, details will be more fully described in the following specification, and pointed out in the claims.

Mechanism embodying the mechanical features of my invention, by which the process may be carried into effect, is illustrated in the accompanying drawings, in which—

Figure 2:
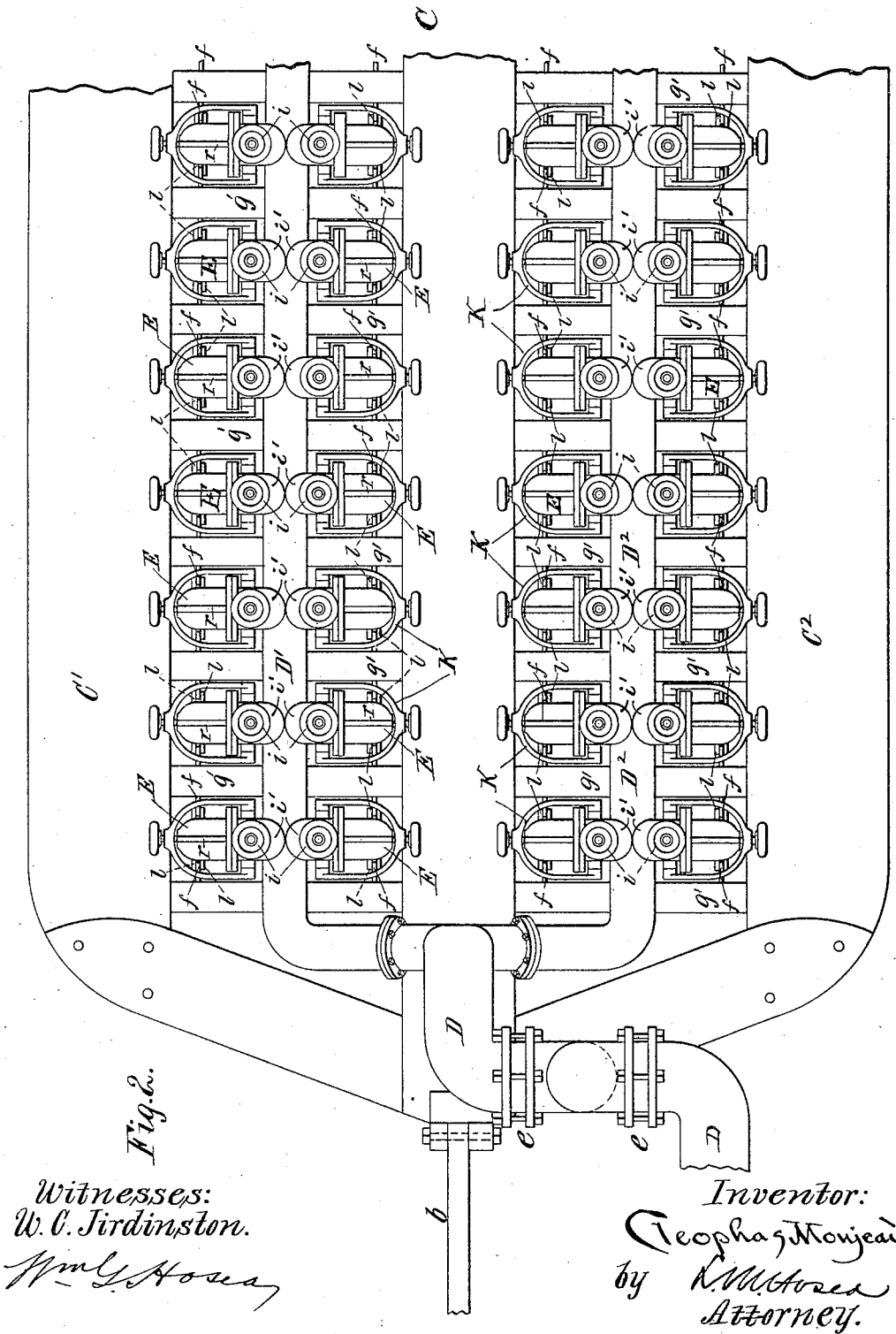

Figure 1 is a side elevation of a floating caisson and series of submerged renewable filtering-inlets, arranged for operation as adapted to the water-supply of cities; Fig. 2, a plan view of the apparatus; Fig. 3, a vertical cross-section; Fig. 4, a vertical cross-section of a similarly-organized apparatus, shown attached to and upheld by piling driven into the bottom of the stream or lake, &c.; Fig 5, a detail axial section of one of the filtering-inlets; Fig. 6, a cross-section of same in the plane X of Fig. 5; and Figs. 7 and 8, cross-sections of a modified form of the floating filter, exemplifying a cheaper construction adapted more particularly to manufacturing or other establishments, or to smaller villages.

Referring now to the drawings, (and premising that they illustrate but one type of many mechanical appliances for carrying the principle of my invention into practical operation,) A designates a stream supposed to be flowing in the direction of the arrow $a$; B, a pier or holding-abutment intended not only to hold the floating filtering apparatus against the current, but as a protection against ice, drift, &c.; and C, a floating filter held to the pier by a link $b$, having a roller $c$, adapted to ride vertically upon a guide $d$ secured to the pier.

D designates the pumping-main secured upon the pier and extending to the pump, and connected with the filter C by expansion-joints $e\ e$ to accommodate the rise and fall according to the stage of water in the stream. These parts are individually constructed in the ordinary manner and may be varied to suit the occasion. The filter C, as I have shown it in one of its preferred forms, consists, essentially, of a float provided with supports for a series of submerged filtering-inlets into which the pumping-main ramifies. In the present example it embodies two stout caissons $C'\ C^2$, (which are preferably made of boiler-plates riveted together,) forming airtight compartments to secure proper flotation. It is desirable to arrange them to constitute a "catamaran" with as little resistance to the current as possible, and braced apart by suitable girders and braces to support a series of submerged vertical parallel bars $f$, arranged in fore and aft vertical planes to present their thin edges to the current. These are suitably braced and secured together at the bottom by cross and strut braces $g$, and fore and aft tie-rods $h$, and at the top by cross-ties $g'$.

In the case illustrated in the drawings the described system of guides and braces is designed to accommodate four parallel series of filtering-inlets arranged in pairs at opposite sides of two branch pumping-mains $D'$ $D^2$, connected to the main $D$ by the described expansion-joints. These branches extend over the floor of the float $C$, above and between adjacent series of vertical guides $f$, and are provided with short side branches or mouths $i'$ at each pair of such guides, each such branch or mouth being provided with a stop cock or valve $i$ and a pivoted "retort" yoke $K$.

The filtering-inlet $E$ (shown more clearly in Fig. 5) is a vertical pipe provided at the upper end with a side mouth, and with side lugs $l$ above and below at each side, and is adapted to pass down and be held and guided by and between each pair of vertical guides $f$, and when in position its mouth is secured to the branch mouth $i'$ by the yoke $K$ and set-screw.

Each filtering-inlet $E$ is preferably constructed as follows, in four parts, to wit: a cast-iron head $m$, an intermediate section or body portion $n$, which may be made of galvanized sheet-iron, a bottom piece $o$ of cast-iron, and a central suction-pipe $p$, these parts being severally constructed and arranged as follows: The head $m$ is provided at each side with a pair of the guide-lugs $l$, and at the top with a loop or eye $r$ for convenience of lifting the filtering-inlet $E$ out of its position in the series for repairs, cleaning, &c., and its side mouth-flange is turned to a true face and recessed to receive the similar mouth-flange of the inner pipe $p$ (presently to be described) and make a tight joint of all parts by the pressure of the screw-yoke $K$. The intermediate section is secured to the base of the part $m$ in any convenient manner, as by rivets or screws $s$ with a tight joint. The intermediate section $n$ is preferably made of galvanized sheet-iron longitudinally corrugated, as shown in Fig. 6, and with one or more longitudinal series of minute perforations at the inner bends of the corrugations. It is secured below to the cast bottom piece $o$ in the same manner as to the head $m$ above, and when in use an exterior cylinder $t$, of wire-gauze, closely fitting upon the external bends of the corrugations, is carried around the outside, and outside of this a further covering $u$, of filtering felt or suitable textile material, is placed, all being freely removable for cleansing. The base-piece $o$ is simply a lower cap and carries the bottom pairs of guide-lugs. The central pipe $p$, which (though I prefer to use it) may be dispensed with, extends within the part $n$ nearly to the bottom, for the purpose of somewhat equalizing the action of the inward draft through the outer pores by drawing the supply from the bottom of the filter, and carries within it a lift check-valve $p'$. When the inner pipe $p$ is not used, the check-valve $p'$ is placed in the tube $E$ at some point above the filtering inlets or apertures. Loose fibrous or a porous material—such as charcoal—may be placed in the outer casing around the pipe $p$. At its upper end it is terminated by a flange clamped between two ring-packings of the parts $m$ and $i'$.

In the general use of the apparatus it is designed to provide so great a number of filtering-mouths as to bring little or no additional strain upon the pumps, and also to permit a very slow and efficient action of each filter. The process of cleansing may go on continually by the attendant, who, closing one of the valves $i$, unfastens the yoke $K$ and swings it vertically over and out of position, and lifts out the filter $E$ and cleanses it without in any way interfering with the action of the remainder of the series of filtering-mouths. It will also be observed that by the arrangement of the filters $E$ in series longitudinally with the current, and with fore and aft parallel open spaces between each two series, the current has full sweep around and against each filter, and thus to a certain extent exerts a cleansing action.

The depth of the filtering-mouths may vary according to circumstances; but in general a maximum limit of fifteen feet is suggested. It is one of the advantages of the system that it takes the water sufficiently near the surface to get the full benefit of the purifying influences of sun and air, and at a median point free from all bottom slime as well as floating impurities at the surface.

I have shown and described the system of filtering-mouths carried upon a floating structure which in most cases is desirable; but it will be obvious that the flotation of the filters is not essential, and that in many cases it would be unnecessary, especially where dams or other structures are provided to maintain the water at a uniform surface-level. I have in Fig. 4 exhibited in the drawings a special adaptation of the apparatus to such conditions, as it practically involves only the omissions of the floating caissons and supporting the guide-frame upon a foundation of piling $z\ z$, which will require no further description.

In order to show that the underlying principle of the system is not dependent upon any particular form or arrangement of its mechanical embodiment I have exhibited in Figs. 7 and 8 a simple and cheap apparatus adapted to the same uses, but more particularly intended for the wants of manufacturing establishments and the like. It consists of a flatboat or "scow" F, provided with a series of box-compartments $w$, fitted with air-tight removable covers $y$, and perforated below through the bottom of the boat or entirely open below and provided with a wire-gauze-screen bottom. Into the compartments project the filtering inlet-mouths E, such as already described, or simply screen-mouths, being there embedded in filtering material, such as sand, gravel, charcoal, or any suitable filtering material. The arrangement of the pumping main D, branch mouths $i'$, and filtering-inlets E is the same as already described. The compartments may be extended below the bottom of the boat, if required.

The filtering-inlet B in any of the applications of my invention may be a pipe of porous clay or stone, or of any other suitable material or construction.

I claim as my invention and desire to secure by Letters Patent of the United States—

1. In a system of water-supply, the combination of a pumping-station, a receiving-main, and a filter consisting of a number of submerged filtering terminals suspended from branches or extensions of the receiving-main carried wholly above the water-surface and detachable independently of each other from said extension-mains without interfering with the general operation of the filter, substantially as set forth.

2. The combination of a pumping-station, a receiving-main, branches or extensions of said main floated above the body of water constituting the source of water-supply, a series of independently-detachable submerged filtering mouths or terminals suspended from said extensions, and valves controlling the communication between said filtering terminals and the extension main or mains, substantially as set forth.

3. The combination of a pumping-station, receiving-main, branches or extensions of said main, a floating vessel or caisson carrying said extension above the water-level, flexible pipes or pipe-joints connecting said receiving-main and extensions and adapted to permit the rise and fall of the caisson while preserving the pipe connections, a series of independent filtering mouths or terminals suspended from said extension-mains and submerged, connections for attaching and detaching said filtering terminals, and valves controlling the water connection between each said terminal and the extension-main independently.

4. A filtering apparatus adapted to be floated upon or founded in a body of water constituting the source of supply, and embodying, essentially, the combination of a frame having a series of parallel guides extending into the body of water, an extension of the pumping-main carried upon and supported by said frame, and filtering-inlets adapted to be held by and upon said guides and detachably and independently secured to said pumping-main extension, substantially as set forth.

5. A floating filter adapted to be carried upon a flowing stream, consisting, substantially, of one or more elongated boat-caissons, a frame-work supporting two or more series of vertical guides arranged in fore and aft planes submerged in the stream and carried upon said caissons, one or more extensions of the pumping-main supported by said caissons above the water between the series of guides, and filtering terminals adapted to be held by and between the guides in fore and aft planes at both sides of the main extensions and detachably secured thereto, substantially as set forth.

6. The filtering terminal E, as constructed, consisting, substantially, of a cast head provided with guide-lugs and a flanged side mouth, a cast base piece or cap also provided with guide-lugs, and an intervening tube-section of perforated cast or sheet metal (preferably corrugated) and adapted to receive an outer casing of fibrous or textile filtering material, substantially as set forth.

7. A filtering terminal embodying, in combination, a perforated tube adapted to be detachably secured to the pumping-main, an outer casing of filtering material, an inner tube extending approximately to the bottom of the perforated tube, and a back-pressure valve seated in the inner tube, substantially as set forth.

In testimony whereof I have hereunto set my hand in the presence of two subscribing witnesses.

CLEOPHAS MONJEAU.

Witnesses:
L. M. HOSEA,
E. L. KERR.